United States Patent
Kanie

(10) Patent No.: US 9,017,885 B2
(45) Date of Patent: Apr. 28, 2015

(54) FUEL SUPPLY SYSTEM

(75) Inventor: Naoki Kanie, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 887 days.

(21) Appl. No.: 12/447,329

(22) PCT Filed: Nov. 14, 2007

(86) PCT No.: PCT/JP2007/072485
§ 371 (c)(1),
(2), (4) Date: Apr. 27, 2009

(87) PCT Pub. No.: WO2008/062805
PCT Pub. Date: May 29, 2008

(65) Prior Publication Data
US 2010/0006596 A1      Jan. 14, 2010

(30) Foreign Application Priority Data

Nov. 24, 2006  (JP) .................................. 2006-317601

(51) Int. Cl.
*H01M 8/04* (2006.01)
*F23K 5/00* (2006.01)

(52) U.S. Cl.
CPC ........... *F23K 5/002* (2013.01); *H01M 8/04201* (2013.01); *H01M 8/04955* (2013.01);
(Continued)

(58) Field of Classification Search
CPC .................................................. H01M 8/04746
USPC ......................................................... 429/428
See application file for complete search history.

(56) References Cited

U.S. PATENT DOCUMENTS 5,913,335 A *   6/1999  Lyall ............................... 138/97
6,082,182 A     7/2000  Fierro et al.
(Continued)

FOREIGN PATENT DOCUMENTS

DE      34 48 533 C2    10/1996
JP      2001-317695 A   11/2001
(Continued)

OTHER PUBLICATIONS

BGV D 34: Unfallverhutungsvorschrift Verwendung von Flussiggas [Accident Prevention Guideline Use of Liquefied Gas], Oct. 1, 1993, in the version of Jan. 1, 1997 (first amendment) with implementation instructions of Apr. 1998. Accompanied by an English translation of a German Office Action dated Feb. 12, 2015 issued in DE Application No. 112007002802.5-23, as concise statement of relevance.

*Primary Examiner* — Ula C. Ruddock
*Assistant Examiner* — Archer Dudley
(74) *Attorney, Agent, or Firm* — Kenyon & Kenyon LLP

(57) ABSTRACT

The object of this invention is to provide a fuel supply system capable of reducing the quantity of a fuel to be discharged from a plurality of fuel tanks connected in parallel is provided. The fuel supply system includes a plurality of the fuel tanks for storing a fuel, on-off valves provided individually for the fuel tanks, and a control unit which controls the opening and closing of the on-off valves. The control unit changes the number of the on-off valves to be simultaneously opened according to a situation. The control unit may reduce the number of the on-off valves to be simultaneously opened after a failure is detected or at the time of maintenance of the fuel supply system.

10 Claims, 2 Drawing Sheets

(52) U.S. Cl.
CPC ... *F17C2221/012* (2013.01); *F17C 2270/0184* (2013.01); *H01M 8/04664* (2013.01); *Y02E 60/321* (2013.01); *Y02E 60/50* (2013.01)
USPC .......................... 429/428; 429/400; 429/443

(56) References Cited

U.S. PATENT DOCUMENTS

| | | | |
|---|---|---|---|
| 7,981,559 B2 * | 7/2011 | Yoshida | 429/446 |
| 2005/0061371 A1 * | 3/2005 | Kimbara et al. | 137/266 |
| 2006/0246177 A1 * | 11/2006 | Miki et al. | 426/24 |

FOREIGN PATENT DOCUMENTS

| | | | | |
|---|---|---|---|---|
| JP | 2003-269255 A | | 9/2003 | |
| JP | 2003269255 | * | 9/2003 | ............ F02M 21/02 |
| JP | 2006-112492 A | | 4/2006 | |
| JP | 2005-226715 A | | 8/2006 | |
| WO | 2005088756 A1 | | 9/2005 | |
| WO | WO2005088755 | * | 9/2005 | ............ H01M 8/04 |

* cited by examiner

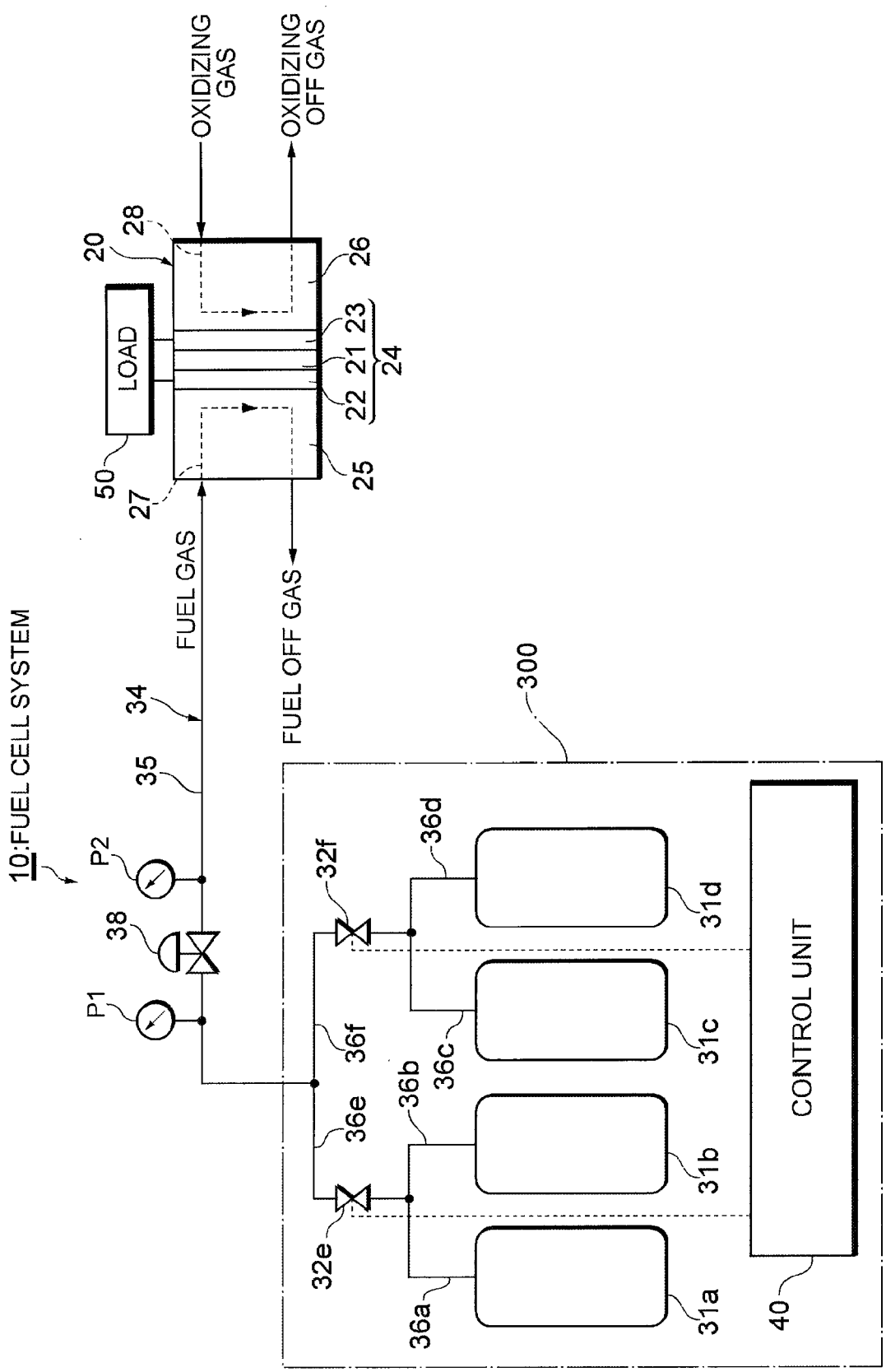

FUEL SUPPLY SYSTEM

This is a 371 national phase application of PCT/JP2007/072485 filed 14 Nov. 2007, which claims priority to Japanese Patent Application No. 2006-317601 filed 24 Nov. 2006, the contents of which are incorporated herein by reference.

TECHNICAL FIELD

The present invention relates to a fuel supply system constituting a part of, for example, a fuel cell system and more particularly to a fuel supply system provided with a plurality of fuel tanks.

BACKGROUND ART

As a fuel supply system for supplying hydrogen gas used as a fuel gas to a fuel cell, there have been known a type using a high-pressure hydrogen tank filled with high-pressure hydrogen gas or a hydrogen storing tank filled with a hydrogen storing alloy which allows hydrogen gas to be reversibly stored and discharged. For instance, the publication of Japanese Patent Application Laid-Open No. 2005-226715 discloses a fuel supply system which has a plurality of hydrogen tanks connected in parallel to a fuel cell through the intermediary of a hydrogen pipe, an on-off valve being installed to each of the hydrogen tanks. The fuel supply system is adapted to open all the on-off valves at the same time when the fuel cell system is in operation.

DISCLOSURE OF INVENTION

According to the fuel supply system disclosed in the Japanese Patent Application Laid-Open No. 2005-226715, it is true that variation in the frequency of use of the hydrogen tanks can be reduced since the hydrogen gas is discharged from a plurality of the hydrogen tanks during an operation. However, it is not necessarily desirable that all the on-off valves always open at the same time. For example, if all the on-off valves simultaneously open when hydrogen gas is passed to check a hydrogen pipe for leakage, then a large quantity of the hydrogen gas will be discharged.

An object of the present invention is to provide a fuel supply system capable of reducing the quantity of a fuel discharged from a fuel tank.

To achieve this object, a fuel supply system in accordance with the present invention includes a plurality of fuel tanks which stores a fuel, a plurality of on-off valves which is provided, one for each fuel tank or one for each set of multiple fuel tanks and which shuts off a fuel discharged from the fuel tanks, and a control unit which controls the opening and closing of the on-off valves. The control unit changes the number of the on-off valves to be simultaneously opened according to a situation.

With this arrangement, the number of the on-off valves to be simultaneously opened can be changed according to a situation rather than being fixed. This obviates the need for discharging a fuel from all the fuel tanks, depending on a situation, thus permitting a reduction in the quantity of the fuel discharged from the fuel tanks. On the other hand, the fuel can be discharged from all the fuel tanks, depending on a situation, thus making it possible to consider a reduction in the variation in the frequency of use.

Preferably, the fuel tanks may be connected in parallel to a fuel receiver device, and the control unit may open all the on-off valves at the same time when supplying the fuel from the fuel tanks to the fuel receiver device.

This configuration allows the fuel to be supplied in a state wherein all the on-off valves are open, permitting a reduction in the variation in the frequency of use of the fuel tanks. Further, in the case where the plurality of the on-off valves is simultaneously opened or closed at the time of fuel supply, the fuel may flow back from one fuel tank to another fuel tank, depending on the pressure level in the fuel tanks; however, the configuration according to the present invention makes it possible to restrain such backflow phenomenon.

Here, the fuel receiver device, for example, a fuel cell which receives a fuel gas supplied as a fuel and generates electric power or an internal combustion engine which receives hydrogen gas or CNG (compressed natural gas) supplied as a fuel and generates mechanical energy or thermal energy.

According to a preferred embodiment, the control unit may reduce the number of the on-off valves to be simultaneously opened after a failure is detected or at the time of maintenance of the fuel supply system.

This arrangement makes it possible to reduce the quantity of a fuel to be discharged in the case where a failure has been detected or at the time of maintenance.

According to another preferred embodiment, the control unit may reduce the number of the on-off valves to be simultaneously opened in the case where no fuel needs to be supplied to a fuel receiver device.

This arrangement makes it possible to reduce the quantity of a fuel to be discharged in the case where no fuel needs to be supplied to a fuel receiver device.

Another fuel supply system according to the present invention to attain the aforesaid object includes fuel tanks which are connected in parallel to a fuel receiver device and which store a fuel; on-off valves provided, one for each fuel tank or one for each set of multiple fuel tanks to shut off a fuel discharged from the fuel tanks; and a control unit which controls the simultaneous opening or closing of all the on-off valves in a first situation. The control unit reduces the number of the on-off valves to be simultaneously opened in a second situation, which is different from the first situation.

With this arrangement, variations in the frequency of use of the fuel tanks can be reduced in the first situation. Further, in the second situation, the number of the on-off valves that simultaneously open is reduced, so that the quantity of the fuel to be discharged from the fuel tanks can be reduced accordingly.

Here, the first situation is, for example, a situation in which the fuel supply system is in a normal mode or a normal supply mode, while the second situation is a situation in which a failure has been detected or maintenance is being carried out.

BRIEF DESCRIPTION OF THE DRAWINGS

FIG. 2 is a block diagram of a fuel cell system to which a fuel supply system according to a modification example of the present invention has been applied.

BEST MODE FOR CARRYING OUT THE INVENTION

Figure 1:
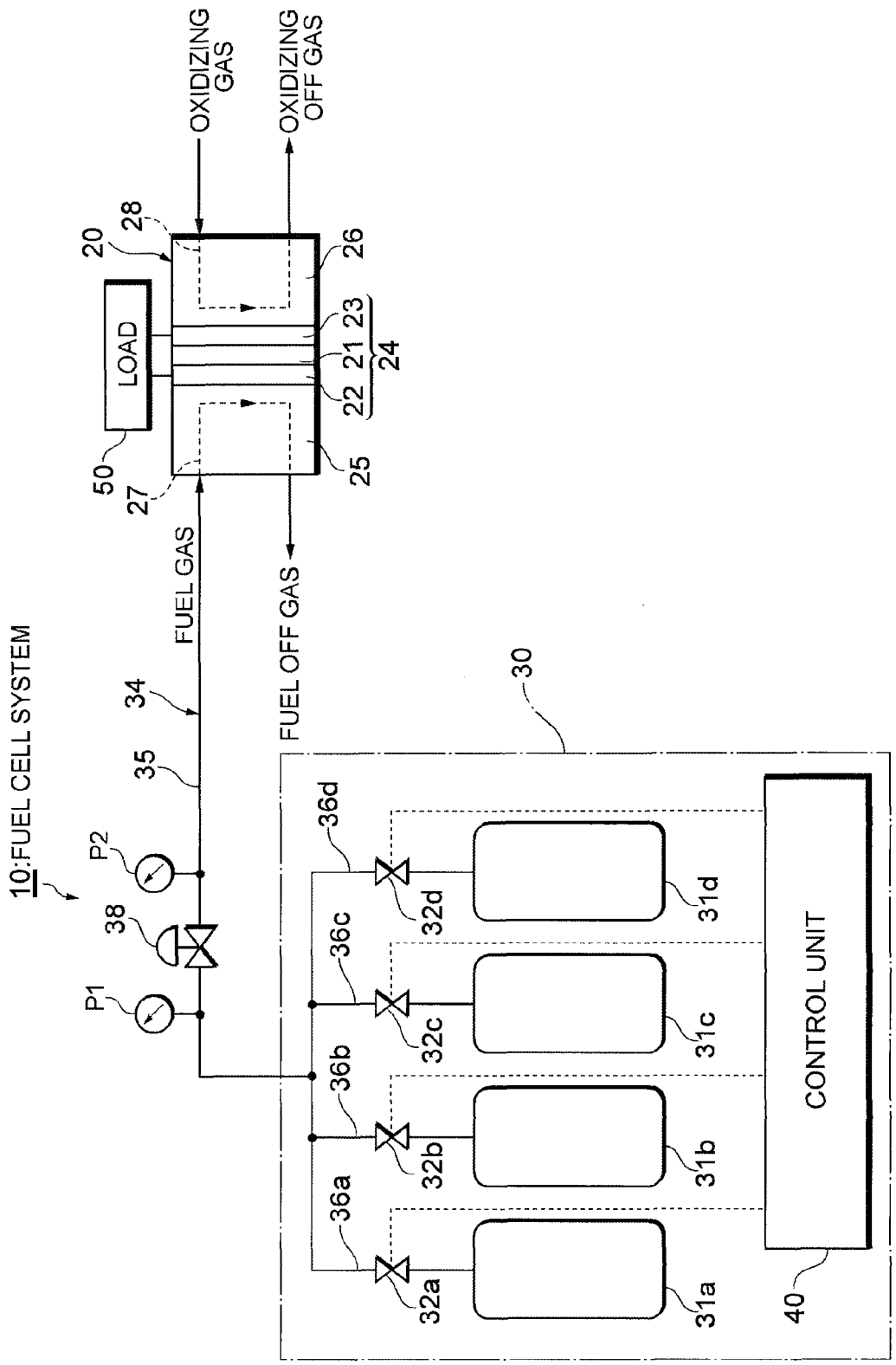
FIG. 1 is a block diagram of a fuel cell system to which a fuel supply system in accordance with the present invention has been applied.

The following will describe a fuel supply system according to preferred embodiments of the present invention with reference to the accompanying drawings. Here, an example in which the fuel supply system in accordance with the present invention has been applied to a fuel gas supply system of a fuel cell system will be described.

FIG. 1 is a block diagram of a fuel cell system 10 with a fuel supply system 30 according to the present embodiment, the diagram focusing especially on a fuel gas supply system.

The fuel cell system 10 can be mounted in a vehicle, such as a fuel cell hybrid vehicle (FCHV), an electric vehicle, and a hybrid vehicle. However, the fuel cell system 10 can be applied also to a variety of mobile bodies (e.g., a ship or aircraft, and a robot or the like) in addition to a vehicle, and also to a fixed power source.

The fuel cell system 10 has a fuel cell 20. The fuel cell 20 receives hydrogen gas supplied as a fuel gas and air supplied as an oxidizing gas, and generates electric power. The fuel gas and the oxidizing gas are generically referred to as reactant gases. The fuel cell 20 is constructed of, for example, a solid polyelectrolyte type, and has a stack structure in which many single cells are stacked. In FIG. 1, for the sake of convenience of explanation, the structure of a single cell is schematically illustrated in the fuel cell 20.

The single cell has an MEA (membrane electrode assembly) 24 composed of an electrolyte membrane 21, a fuel electrode 22, and an air electrode 23. The electrolyte membrane 21 is formed of an ion-exchange membrane formed of, for example, a fluorinated resin. The fuel electrode 22 and the air electrode 23 are provided on both surfaces of the electrolyte membrane 21. The single cell has a pair of separators 25 and 26 sandwiching the fuel electrode 22 and the air electrode 23 from both sides. A fuel gas is supplied to a fuel gas passage 27 of the separator 25, while an oxidizing gas is supplied to an oxidizing gas passage 28 of the separator 26. An electrochemical reaction of the fuel gas and the oxidizing gas, which have been supplied, causes the fuel cell 20 to generate electric power. The power generated by the fuel cell 20 is supplied to a load 50, such as a traction motor.

The fuel supply system 30 has four fuel tanks 31a to 31d and four on-off valves 32a to 32d. The fuel tanks 31a to 31d are connected in parallel to the fuel cell 20, which is the fuel receiver device. The on-off valves 32a to 32d are respectively provided for the corresponding fuel tanks 31a to 31d. The numbers of the fuel tanks and the on-off valves are arbitrary.

The fuel tanks 31a to 31d may be either high-pressure hydrogen tanks which store a high-pressure hydrogen gas or hydrogen storing tanks which store a hydrogen storing alloy allowing hydrogen to be reversely stored and discharged. A high-pressure hydrogen tank stores a hydrogen gas of, for example, 35 MPa or 70 MPa. The fuel tanks 31a to 31d may be ones that store a compressed natural gas of 20 MPa. In short, the fuel tanks 31a to 31d may be any type as long as they store a fuel gas so that they are capable of supplying the fuel gas to the fuel cell 20 or fuel receiver device.

The fuel gas discharged from the fuel tanks 31a to 31d is supplied to the fuel gas passage 27 in the fuel cell 20 via a supply flow path 34. The supply flow path 34 has a merging flow path 35 connected to the fuel gas passage 27, and branched flow paths 36a to 36d, which have been split from the merging flow path 35 into four braches. The merging flow path 35 is provided with, for example, one pressure reducing valve 38. The upstream side and the downstream side of the pressure reducing valve 38 are provided with pressure sensors P1 and P2, respectively, for detecting the pressure of the fuel gas. The branched flow paths 36a to 36d are disposed in parallel to the fuel cell 20 and connected to the corresponding fuel tanks 31a to 31d, respectively. Further, the branched flow paths 36a to 36d are provided with the corresponding on-off valves 32a to 32d, respectively.

The on-off valves 32a to 32d shut off the fuel gas discharged from their corresponding fuel tanks 31a to 31d. In other words, the on-off valves 32a to 32d function as root valves (main stop valves) for the individual fuel tanks 31a to 31d. The on-off valves 32a to 32d are formed of, for example, electromagnetic cutoff valves, and electrically connected to a control unit 40. Although detailed explanation will be omitted, the on-off valves 32a to 32d may be of a type built in a valve assembly connected to each of the caps of the fuel tanks 31a to 31d or a type built in an outer pipe of a valve assembly. Regulator valves for reducing the pressure of the fuel gas may be provided in the branched flow paths 36a to 36d.

Here, the diameters of the on-off valves 32a to 32d (the cross-sectional areas of the flow paths) may be all the same. In the present embodiment, each of the diameters of the on-off valves 32a to 32d is set to be smaller the pipe diameter of the merging flow path 35 (the cross-sectional area of the flow path). On the other hand, the total sum of the diameters of the on-off valves 32a to 32d is set to be larger than the pipe diameter of the merging flow path 35. Hence, if all the on-off valves 32a to 32d are opened, then the flow rate of the fuel gas is limited to the pipe diameter of the merging flow path 35. If only the on-off valve 32a is opened, then the flow rate of the fuel gas is limited to the diameter of the on-off valve 32a.

As may be understood from FIG. 1, opening the on-off valves 32a to 32d causes the fuel gas stored in the fuel tanks 31a to 31d to be discharged into the branched flow paths 36a to 36d so as to flow into the merging flow path 35, thereby being supplied to the fuel cell 20. When the flow of the fuel gas described above is considered, the supply flow path 34 and the control unit 40 may be recognized as constituent elements of the fuel supply system 30.

The control unit 40 is constructed of a microcomputer incorporating a CPU, a ROM, and a RAM therein. The CPU executes desired computation according to a control program to carry out various types of processing and control, including the control of the opening and closing of the on-off valves 32a to 32d and the detection of failures of the fuel supply system 30. The ROM stores a control program run by the CPU and control data. The RAM is used mainly as various types of work areas for control processing.

The control unit 40 receives detection signals input from various sensors, such as a voltage sensor, a current sensor, and a vehicle accelerator pedal opening degree sensor, which are not illustrated, in addition to the pressure sensors P1 and P2. Based on the input results, the control unit 40 outputs control signals to constituent elements of the fuel cell system 10. In particular, the control unit 40 controls the opening and closing of the on-off valves 32a to 32d as described below.

When the fuel cell system 10 is in a normal operation mode or when the fuel supply system 30 is in a normal mode, the control unit 40 simultaneously opens all of the on-off valves 32a to 32d. For instance, in the case where the fuel gas is supplied to the fuel cell 20 on the basis of a required output of the fuel cell 20, all the on-off valves 32a to 32d are simultaneously opened, and the open-valve state is maintained. This results in a state wherein the fuel gas is discharged from all the fuel tanks 31a to 31d. Then, at the end of an operation of the fuel cell system 10, the control unit 40 simultaneously closes all the on-off valves 32a to 32d.

Thus, holding all the on-off valves 32a to 32d open in the normal operation mode of the fuel cell system 10 makes it possible to reduce the variation in the frequency of use of the fuel tanks 31a to 31d and also to prevent the backflow of the fuel gas among the fuel tanks 31a to 31d.

To be more specific, if, for example, only the on-off valve 32a is opened during the normal operation mode to discharge the fuel gas only from the fuel tank 31a to a certain extent, then the pressure in the fuel tank 31a becomes lower than the pressures in the remaining fuel tanks 31b to 31d. Here, if it is assumed that the on-off valve 32b is opened when the fuel gas in the fuel tank 31a is nearly completely consumed, then the fuel gas in the fuel tank 31b may flow into not only the fuel cell 20 but also into the fuel tank 31a with a lower pressure. Therefore, in order to prevent such a backflow phenomenon, the control unit 40 simultaneously opens or closes all the on-off valves 32a to 32d in the normal operation mode.

On the other hand, in case of a failure, the leakage of the fuel gas may take place due to a crack or the like in a pipe constituting the supply flow path 34. The leakage of the fuel gas leads to pressure drop in the pipe, which can be detected by the pressure sensors P1 and P2. For example, if the leakage of the fuel gas happens in the pipe on the downstream side of the pressure reducing valve 38, then the pressure value detected by the pressure sensor P2 will be lower than a set secondary pressure of the pressure reducing valve 38. Based on the level of the pressure drop, the control unit 40 determines whether or not the leakage of the fuel gas has occurred. If it is determined that the fuel gas is leaking, then preferably, the fuel gas is supplied to the fuel cell 20 in a state wherein the power generation of the fuel cell 20 is stopped, thereby rechecking whether the fuel gas is really leaking from the supply flow path 34.

In the present embodiment, when carrying out such recheck, the number of the on-off valves 32a to 32d to be simultaneously opened is reduced rather than opening all the on-off valves 32a to 32d at the same time. Preferably, in the present embodiment, only one of the on-off valves 32a to 32d may be opened for the recheck. In another embodiment, when carrying out the recheck, only the on-off valve corresponding to a fuel tank holding a largest storage quantity of the fuel gas or a fuel tank having a highest pressure among the fuel tanks 31a to 31d may be opened.

Thus, according to the present embodiment, when carrying out the recheck, the number of the on-off valves 32a to 32d to be opened at the same time is decreased, making it possible to reduce the quantity of the fuel gas discharged from the fuel tanks 31a to 31d. Especially, as the number of the on-off valves 32a to 32d which are simultaneously opened is reduced, the quantity of the fuel gas discharged from the fuel tanks 31a to 31d can be reduced accordingly. For example, if only the on-off valve 32a is opened, then the flow rate of the fuel gas flowing through the merging flow path 35 is limited not to the pipe diameter of the merging flow path 35 but to the diameter of the on-off valve 32a, which is smaller than that of the merging flow path 35. This makes it possible to minimize the quantity of the fuel gas discharged from the fuel tank 31a.

As explained above, according to the present embodiment, the number of the on-off valves 32a to 32d which are simultaneously opened can be changed according to the situation of the fuel supply system 30. Therefore, in a situation, such as the normal mode (the first situation), of the fuel supply system 30, the fuel tanks 31a to 31d can be used in a good balance while properly supplying the fuel gas to the fuel cell 20. Meanwhile, in a situation, such as a failure mode, (the second situation) of the fuel supply system 30, the quantity of the fuel gas to be discharged can be reduced. Moreover, a reduced number of the on-off valves 32a to 32d to be simultaneously opened permits reduced power consumption to be achieved.
<Modification Example>

According to another embodiment, the control unit 40 may reduce the number of the on-off valves 32a to 32d to be simultaneously opened in a case other than the case where recheck is carried out after a failure is detected. For instance, there is a case where the pipe or the like of the supply flow path 34 is replaced because of the fuel gas leakage, as described above. In the case of the recheck during the maintenance in the aforesaid replacement, the number of the on-off valves 32a to 32d to be simultaneously opened may be also reduced.

Further, the control unit 40 may reduce the number of the on-off valves 32a to 32d to be simultaneously opened in the case where the supply itself of a fuel gas to the fuel cell 20 is unnecessary. Here, "where the supply itself of a fuel gas to the fuel cell 20 is unnecessary" refers to, for example, the case where there is no request for power generation by the fuel cell 20, in addition to the case where the recheck is carried out after a failure is detected or the recheck is carried out at the time of maintenance, as described above.

FIG. 2 is a block diagram illustrating a fuel cell system 10 provided with a fuel supply system 300 according to a modification example. The fuel supply system 300 differs from the fuel supply system 30 illustrated in FIG. 1 mainly in that on-off valves 32e and 32f are provided for every two fuel tanks of the fuel tanks 31a to 31d. The apparatuses and the like having the same reference numerals as those shown in FIG. 1 denote the same devices and the like, and the detailed explanation thereof will be omitted.

The on-off valves 32e and 32f are provided in branched flow paths 36e and 36f, respectively, which have been bifurcated from a merging flow path 35. The flow paths branched from the branched flow path 36e correspond to the aforesaid branched flow paths 36a and 36b, while the flow paths branched from the branched flow path 36f correspond to the aforesaid branched flow paths 36c and 36d. The on-off valve 32e functions as a root valve for a first tank group consisting of the fuel tanks 31a and 31b, and shuts off a fuel gas discharged from the fuel tanks 31a and 31b. The on-off valve 32f functions as a root valve for a second tank group consisting of the fuel tanks 31c and 31d, and shuts off a fuel gas discharged from the fuel tanks 31c and 31d.

Thus, a control unit 40 simultaneously opens or closes the on-off valves 32e and 32f in a situation, such as a normal mode, (a first situation) of the fuel supply system 30. Meanwhile, the control unit 40 opens only one of the on-off valves 32e and 32f at the time of recheck in the same situation (a second situation) as that described above, including the situation wherein a failure of the fuel supply system 30 is detected or maintenance is carried out. This arrangement makes it possible to reduce the number of the on-off valves 32e and 32f to be simultaneously opened, so that the quantity of the fuel gas discharged from the fuel tanks 31a to 31d can be reduced accordingly, as with the case described above.

The number of the fuel tanks and the number of the on-off valves to be included in a tank group are arbitrary as long as the on-off valves are provided for each set of multiple ones of a plurality of fuel tanks.

The invention claimed is:
1. A fuel supply system comprising:
a plurality of fuel tanks which store a fuel;
a fuel cell to which the fuel is supplied from the fuel tanks;
a plurality of on-off valves which are provided, one for each fuel tank or one for each set of multiple fuel tanks, and which shut off a fuel discharged from the fuel tanks; and
a control unit which is programmed to control the opening and closing of the on-off valves,
a supply flow path through which the fuel flows from the fuel tanks to the fuel cell,
at least one pressure sensor which detects pressure of the fuel in the supply flow path, wherein the control unit is programmed to determine, based on the at least one pressure sensor, whether or not there is a fuel leakage from the supply flow path, and if the control unit determines that there is the fuel leakage, the control unit is programmed to reduce a number of the on-off valves to be simultaneously opened, and to open at least one of the on-off valves, in a state where power generation of the fuel cell has been stopped, so as to reduce the quantity of the fuel discharged, and to recheck whether or not there is a fuel leakage.

2. The fuel supply system according to claim 1, wherein the fuel tanks are connected in parallel to the fuel cell, and the control unit is programmed to simultaneously open all the on-off valves when supplying the fuel from the fuel tanks to the fuel cell.

3. The fuel supply system according to claim 2, wherein the control unit is programmed to reduce the number of the on-off valves to be simultaneously opened after in the case where leakage of a fuel has occurred.

4. A fuel supply system comprising:
a plurality of fuel tanks which store a fuel;
a fuel cell to which the fuel is supplied from the fuel tanks;
a plurality of on-off valves, wherein each of the plurality of on-off valves shuts off the fuel discharged from at least one of the plurality of fuel tanks; and
a control unit which is programmed to control the opening and closing of the on-off valves,
a supply flow path through which the fuel flows from the fuel tanks to the fuel cell,
at least one pressure sensor which detects pressure of the fuel in the supply flow path,
wherein the control unit is programmed to determine, based on the at least one pressure sensor, whether or not there is a fuel leakage from the supply flow path, and
if the control unit determines that there is the fuel leakage, the control unit is programmed to reduce a number of the plurality of on-off valves that shut off the fuel discharged from the plurality of fuel tanks to be simultaneously opened, and to open at least one of the on-off valves, in a state where power generation of the fuel cell has been stopped, so as to reduce the quantity of the fuel discharged, and to recheck whether or not there is a fuel leakage.

5. The fuel supply system according to claim 4, wherein the control unit is programmed to reduce the number of the on-off valves to be simultaneously opened in the case where a pipe constituting the supply flow path is replaced.

6. The fuel supply system according to claim 2, wherein the control unit is programmed to reduce the number of the on-off valves to be simultaneously opened in the case where supply of the fuel to the fuel cell is unnecessary.

7. The fuel supply system according to claim 1, wherein the control unit is programmed to open only an on-off valve corresponding to a fuel tank holding a largest storage of the fuel in the case where the number of the on-off valves to be simultaneously opened is reduced.

8. The fuel supply system according to claim 1, wherein the control unit is programmed to open only an on-off valve corresponding to a fuel tank having a highest pressure in the case where the number of the on-off valves to be simultaneously opened is reduced.

9. The fuel supply system according to claim 4, wherein the control unit is programmed to open only an on-off valve corresponding to a fuel tank holding a largest storage of the fuel in the case where the number of the on-off valves to be simultaneously opened is reduced.

10. The fuel supply system according to claim 4, wherein the control unit is programmed to open only an on-off valve corresponding to a fuel tank having a highest pressure in the case where the number of the on-off valves to be simultaneously opened is reduced.

* * * * *